US006304681B1

(12) United States Patent
Akiba et al.

(10) Patent No.: US 6,304,681 B1
(45) Date of Patent: *Oct. 16, 2001

(54) IMAGE PROCESSING APPARATUS FOR EXECUTING IMAGE PROCESSING IN CORRESPONDENCE WITH PORTRAIT AND LANDSCAPE TYPES

(75) Inventors: Rieko Akiba, Shizuoka-ken; Tokuharu Kaneko; Shokyo Koh, both of Mishima; Keizo Isemura, Koganei; Yukari Toda; Hirohiko Tashiro, both of Yokohama; Akinobu Nishikata, Mishima; Masanobu Inui, Chigasaki; Nobuo Sekiguchi, Shizuoka-ken; Nobuaki Miyahara, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,773

(22) Filed: Sep. 22, 1997

(30) Foreign Application Priority Data

Sep. 26, 1996 (JP) .................................................. 8-254787
Nov. 25, 1996 (JP) .................................................. 8-313491

(51) Int. Cl.[7] .................................................... G06K 9/32
(52) U.S. Cl. .......................... 382/297; 358/296; 358/1.18
(58) Field of Search ..................................... 382/295–297; 358/296, 444, 115–116, 1.18, 1.17, 449, 448, 406, 442, 451, 474, 486, 488; 399/408, 368, 410; 395/116–117; 412/11; 707/500

(56) References Cited

U.S. PATENT DOCUMENTS

| | | | |
|---|---|---|---|
| 4,912,518 | * 3/1990 | Matsuo ................................. | 399/368 |
| 5,383,754 | * 1/1995 | Sunmida et al. ....................... | 412/11 |
| 5,485,554 | * 1/1996 | Lowitz et al. ........................ | 395/116 |
| 5,513,304 | * 4/1996 | Spitz et al. ............................ | 707/500 |
| 5,625,466 | * 4/1997 | Nakajima ............................. | 358/449 |
| 5,627,650 | * 5/1997 | Noaski et al. ........................ | 358/296 |
| 5,649,033 | * 7/1997 | Morikawa et al. ................... | 382/297 |
| 5,930,001 | * 7/2000 | Satoh et al. .......................... | 358/296 |

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

An image processing apparatus includes a first determination unit for determining the direction of an input image, a second determination unit for determining if the input image is a portrait type or landscape type, and an image rotation unit for rotating the input image in correspondence with the determination results of the first and second determination units. The image rotation unit rotates one of portrait type and landscape type images to adjust the direction of the image in a predetermined direction, and rotates the other one of portrait type and landscape type images to adjust the direction of the image in a direction perpendicular to the predetermined direction.

15 Claims, 18 Drawing Sheets

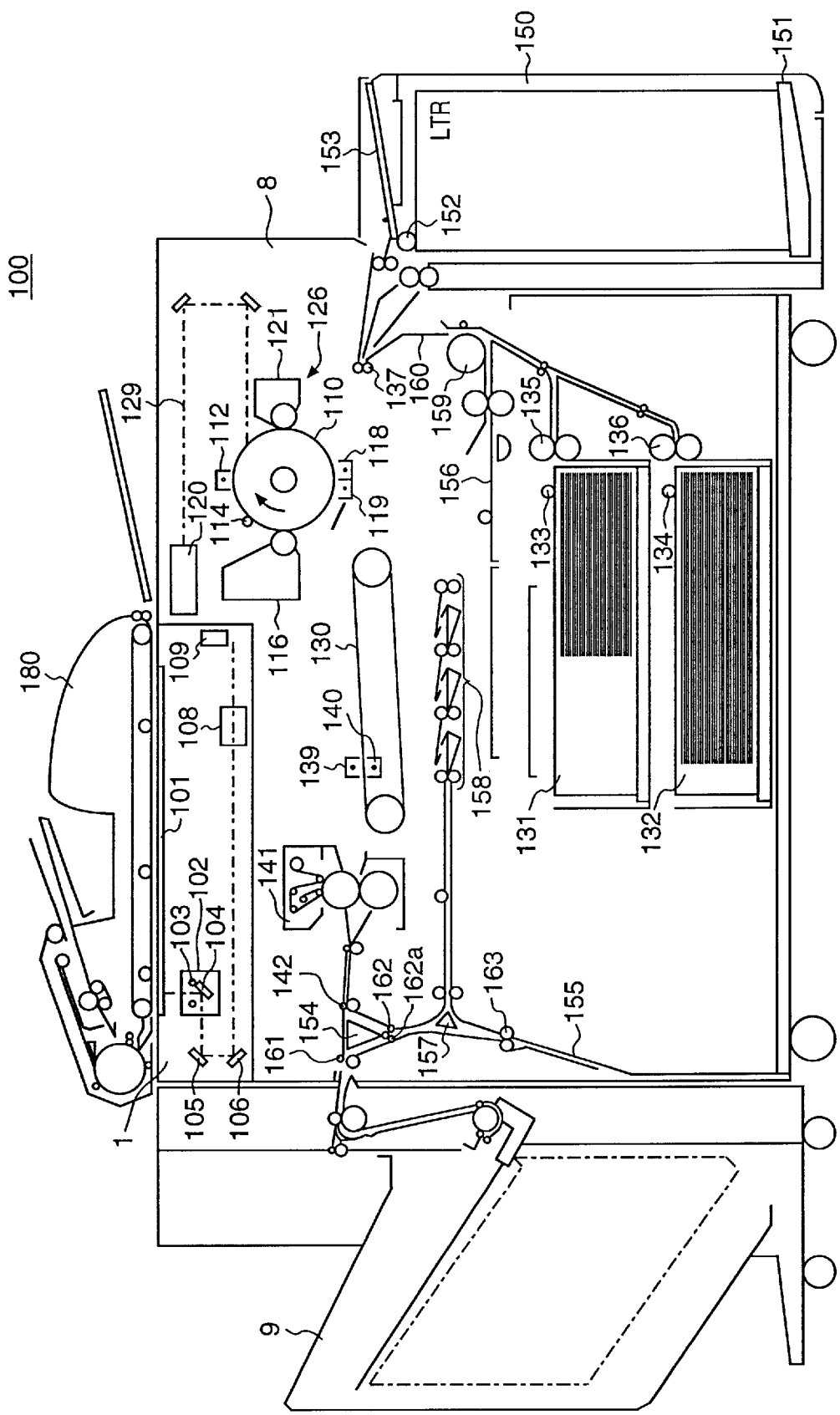

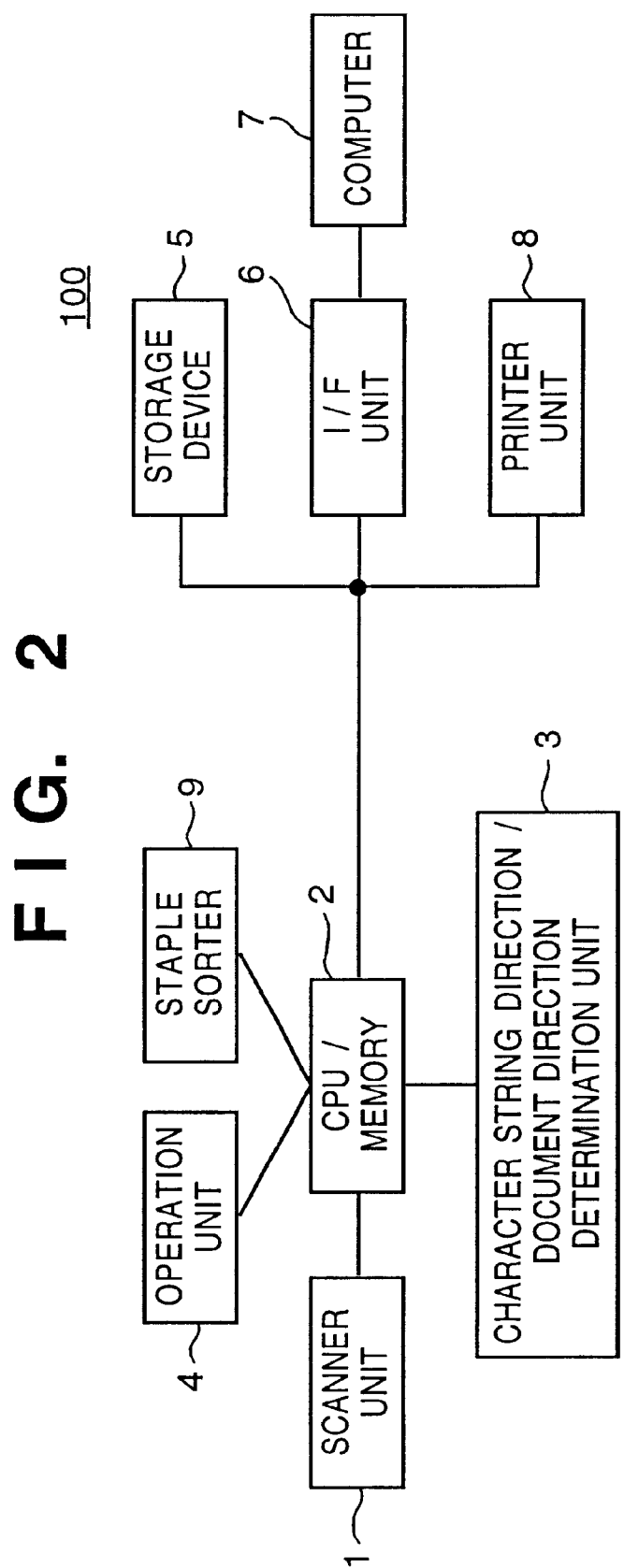

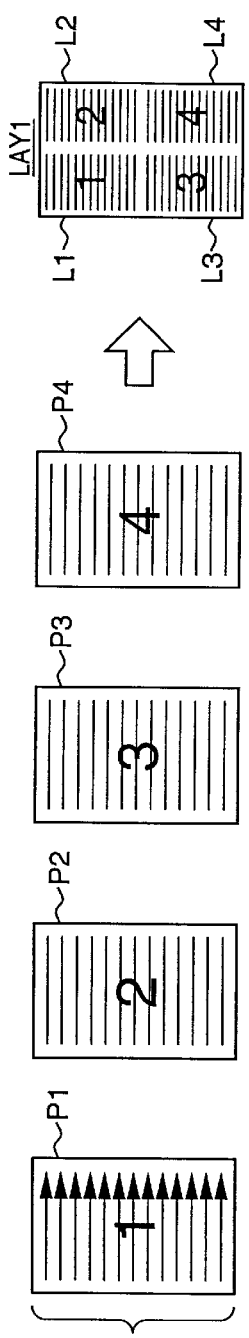
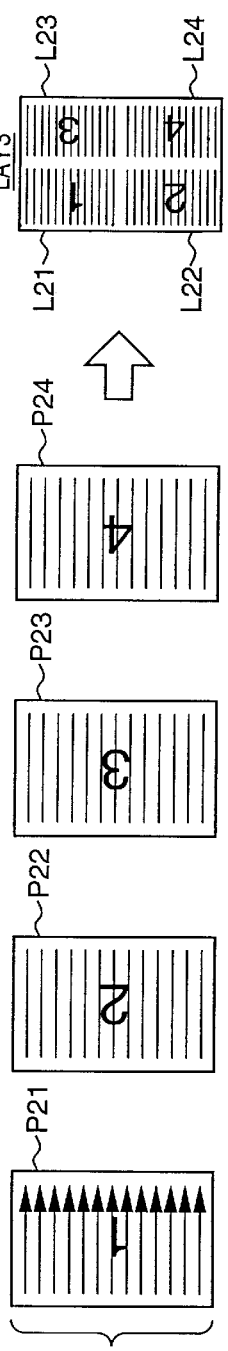
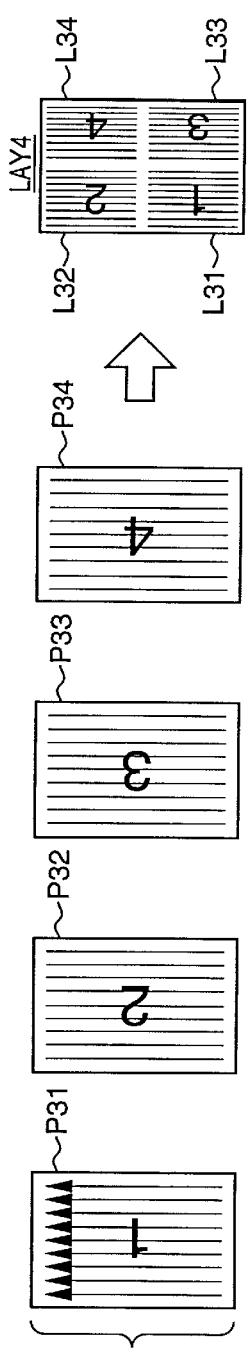
FIG. 14A  FIG. 14B  FIG. 14C  FIG. 14D

FIG. 15
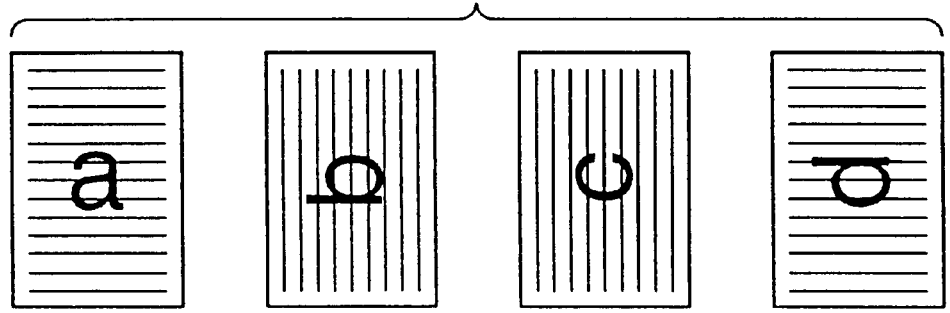
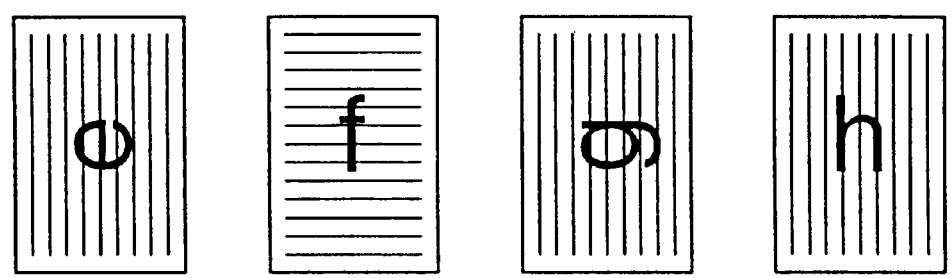
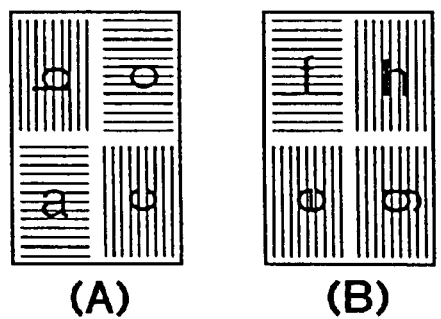
(A)     (B)
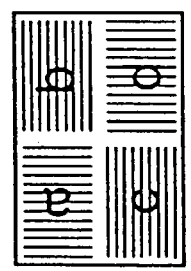 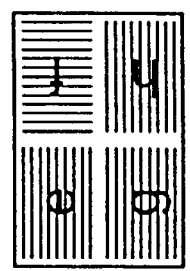
(C)     (D)

FIG. 17
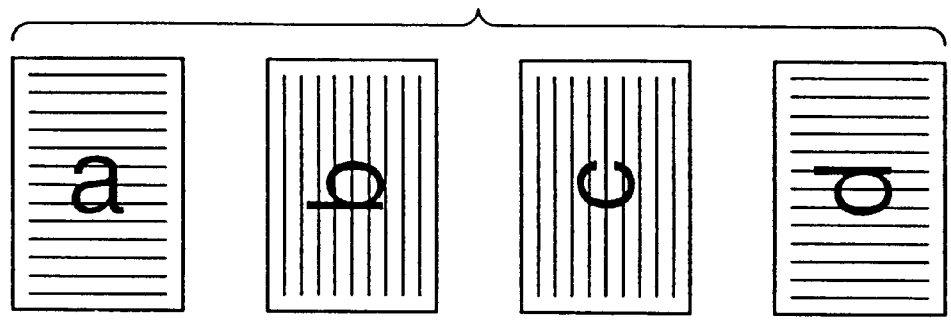
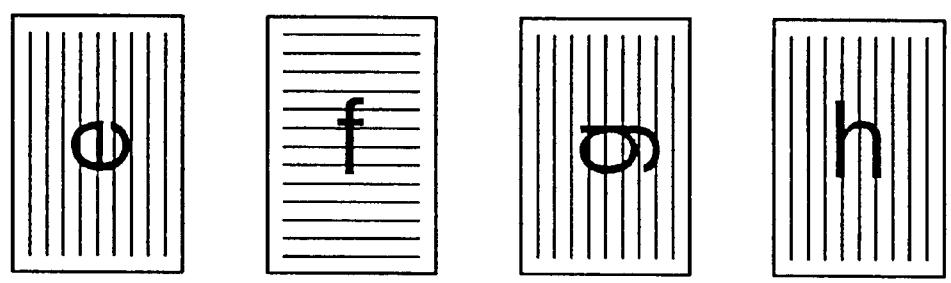
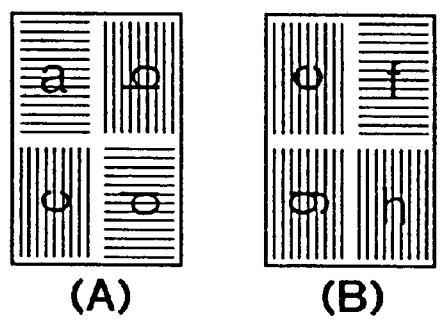
(A)    (B)
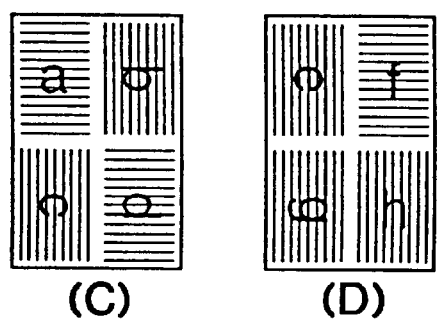
(C)    (D)

MEMORY MAP OF STORAGE MEDIUM

IMAGE PROCESSING APPARATUS FOR EXECUTING IMAGE PROCESSING IN CORRESPONDENCE WITH PORTRAIT AND LANDSCAPE TYPES

BACKGROUND OF THE INVENTION

1. Field of the Invention

The present invention relates to an image processing apparatus for executing image processing in correspondence with the portrait and landscape types.

2. Description of the Related Art

In recent years, a copying machine that recognizes characters in an image of the read original in four directions, and determines the direction of the image in accordance with the recognition result has been proposed. The copying machine rotates the original image in accordance with the determination result of direction of the image, and forms the rotated image on a sheet.

Originals include a portrait type original whose length is larger than its width, and a landscape type original whose width is larger than its length. Assume that originals including both the portrait and landscape types are to be copied by the copying machine. For example, if the directions of images are adjusted in one direction, the copied sheets are exhausted as a cross-shaped stack of sheets. On the other hand, when the directions of the copied sheets are adjusted in one direction, since the directions of images do not agree with each other, the direction of images of one type cannot be determined.

On the other hand, a copying machine has a function of copying a plurality of originals while laying out their images on a single sheet. This function lays out, e.g., four originals images in the order of upper left, upper right, lower left, and lower right positions on a sheet. If such function is executed for originals including both portrait and landscape type originals, the images of these types are laid out in different directions. In this case, whether a user reads such copies based on either type of originals differs depending on personal differences. That is, if a user, who reads copies based on the landscape type, reads copied sheets laid out based on the landscape type, he or she may read texts in a wrong order.

SUMMARY OF THE INVENTION

It is an object of the present invention to provide an image processing apparatus which can solve the above-mentioned problems.

It is another object of the present invention to provide an image processing apparatus which can solve a problem posed when originals include both the portrait and landscape type originals.

Other objects and features of the present invention will become apparent from the following specification.

BRIEF DESCRIPTION OF THE DRAWINGS

FIG. 1 is a sectional view of an image forming apparatus;

FIG. 2 is a block diagram of the image forming apparatus;

FIGS. 14A to 14D are views for explaining the first layout mode processing;

FIG. 15 is a view showing an example for determining layout in correspondence with the majority original direction;

FIG. 17 is a view showing an output example of the second layout mode;

DETAILED DESCRIPTION OF THE PREFERRED EMBODIMENTS

Figure 3A:
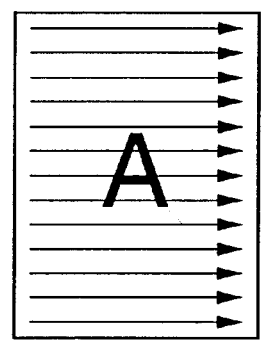
FIG. 3A is a view for explaining one original type.

An image processing apparatus according to an embodiment of the present invention can detect the directions of originals independently of the placing directions of a plurality of originals having different document directions, and can staple copies or form a binding margin at the position designated by the user when the exhaust direction of output sheets is designated.

Image processing apparatuses according to the individual embodiments of the present invention will be described in detail hereinafter with reference to the accompanying drawings.

[First Embodiment]

FIG. 1 is a sectional view showing an example of an image forming apparatus according to an embodiment of the present invention. Reference numeral 100 denotes a copying apparatus main body; and 180, a repeating automatic document feeder (RDF), which feeds originals in turn from the start or last page.

Referring to FIG. 1, reference numeral 101 denotes a platen glass serving as an original placing table; 102, a scanner; 103, an original illumination lamp; and 104, a scanning mirror.

The scanner 102 is reciprocally scanned by a motor (not shown) in predetermined directions, and light reflected by an original is transmitted through a lens 108 via scanning mirrors 104 to 106, thus forming an image on a CCD sensor 109. A scanner unit 1 has the above-mentioned arrangement.

A printer unit 8 will be described below. Reference numeral 120 denotes an exposure control unit comprising, e.g., a laser, polygonal scanner, and the like. The exposure control unit 120 irradiates, onto a photosensitive drum 110, a laser beam 120, modulated on the basis of an image signal which is converted into an electrical signal by the CCD sensor (image sensor unit) 109 and is subjected to predetermined image processing (to be described later).

A primary charger 112, a developer 121, a transfer charger 118, a cleaning device or unit 116, and a pre-exposure lamp 114 are arranged around the photosensitive drum 110.

In an image forming unit 126, the photosensitive drum 110 is rotated in the direction indicated by an arrow in FIG. 1, and is charged to a desired potential by the primary charger 112. Thereafter, the laser beam 129 from the exposure control unit 120 is irradiated on the photosensitive drum 110, thus forming an electrostatic latent image thereon.

The electrostatic latent image formed on the photosensitive drum 110 is developed by the developer 121 so as to be visualized as a toner image.

A transfer sheet fed from an upper or lower cassette 131 or 132 by a pickup roller 133 or 134 is fed into the main body by feed rollers 135 or 136, and the visualized toner image is transferred onto the transfer sheet by the transfer charger 118. After the transfer, the residual toner on the photosensitive drum 110 is cleaned by the cleaning unit 116, and the residual charge is erased by the pre-exposure lamp 114.

After the transfer, the transfer sheet is peeled from a transfer belt 130, and the toner image thereon is re-charged by pre-fixing chargers 139 and 140. The transfer sheet is then fed to a fixing unit 141 and the toner image is fixed by pressure and heat. Thereafter, the transfer sheet is exhausted outside the main body 100 by exhaust rollers 142.

The main body 100 is equipped with a deck 150 that can stock, e.g., 4,000 transfer sheets. A lifter 151 of the deck 150 moves upward in correspondence with the quantity of transfer sheets so that the uppermost transfer sheet always contacts a feed roller 152. Also, a multi manual insertion port 153 that can stock 100 transfer sheets is also equipped.

Furthermore, in FIG. 1, reference numeral 154 denotes an exhaust flapper, which switches the route between the two-side recording or multiple recording side, and the exhaust side. The transfer sheet fed from the exhaust rollers 142 is switched to the two-side recording or multiple recording side. Also, reference numeral 158 denotes a lower convey path, which reverses the transfer sheet fed from the exhaust rollers 142 via a reversing path 155, and guides it toward a re-feed tray 156. Furthermore, reference numeral 157 denotes a multiple flapper for switching the route between the two-sided recording and multiple recording. When the multiple flapper 157 is turned to the left, the transfer sheet is directly guided to the lower convey path 158 without going through the reversing path 155.

Reference numeral 159 denotes a feed roller for feeding the transfer sheet toward the photosensitive drum 110 via a route 160. Reference numeral 161 denotes an exhaust roller which is arranged in the vicinity of the exhaust flapper 154, and exhausts, outside the apparatus, the transfer sheet whose route has been switched to the exhaust side by the exhaust flapper 154. In the two-sided recording (two-sided copying) or multiple recording (multiple copying) mode, the exhaust flapper 154 is moved upward, and the copied transfer sheet is stored in the re-feed tray 156 while being reversed via the convey paths 155 and 158. At this time, in the two-sided recording mode, the multiple flapper 157 is turned to the right. In the multiple recording, the transfer sheets stored in the re-feed tray 156 are picked up one by one from the lowermost one by the feed roller 159, and the picked-up sheet is guided toward registration rollers 137 of the main body via the route 160.

When the reversed transfer sheet is exhausted from the main body, the exhaust flapper 154 is pushed upward, and the flapper 154 is turned to the right to convey the copied transfer sheet toward the convey path 155. After the trailing end of the transfer sheet has passed a first feed roller 162, the transfer sheet is conveyed by reversing rollers 163 toward a second feed roller, and is reversed and exhausted outside the apparatus by exhaust rollers 161.

FIG. 2 shows the arrangement of the image processing apparatus according to the embodiment of the present invention.

The arrangement of the scanner unit 1 is as described above.

A CPU/memory unit 2 executes various kinds of control, and temporarily stores image data.

A document direction/character string direction determination unit 3 recognizes characters in several different character regions in a document from 0°, 90°, 180°, and 270° directions by looking up a character recognition dictionary, and determines the character direction on the basis of the character recognition result. Furthermore, the unit 3 determines the character string direction on the basis of the determined character direction and the width of a region between neighboring characters, i.e., whether a document is horizontally or vertically written.

An operation unit 4 has a display unit for displaying the operation state of the copying apparatus 100, and also has keys and the like used for designating operations of the copying apparatus 100.

A storage device 5 comprises, e.g., a hard disk, a magneto-optical disk, or the like, and is used for saving various processing results (image data, character recognition result, and the like). An interface unit (I/F unit) 6 comprises a SCSI interface, RS232C interface, or the like, and is used for transmitting or receiving data to or from an external device.

A computer 7 acquires data from a movable storage device such as a magneto-optical disk via the I/F unit 6, and uses it.

The printer unit 8 prints out image data which is input from the scanner unit 1 and is edited and/or processed on the basis of the character recognition information.

A staple sorter 9 sorts and outputs recording media printed by the printer unit 8, and staples them if the stapling mode is designated at the operation unit 4.

Figure 3B:
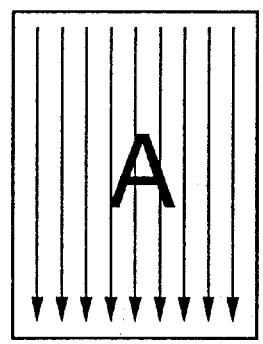
FIG. 3B is a view for explaining another original type.
Figure 3C:
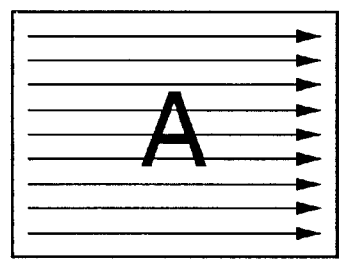
FIG. 3C is a view for explaining still another original type.
Figure 3D:
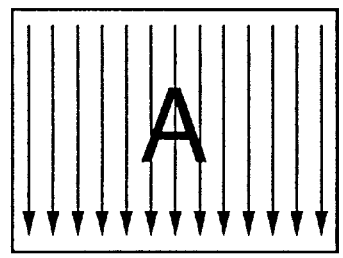
FIG. 3D is a view for explaining still another original type.

The original types will be explained below with reference to FIGS. 3A to 3D. FIG. 3A shows a horizontally written portrait type, FIG. 3B shows a vertically written portrait type, FIG. 3C shows a horizontally written landscape type, and FIG. 3D shows a vertically written landscape type. As can be seen in FIGS. 3A to 3D, there are four different types.

When originals include a plurality of different types, the user can designate the exhaust direction of documents on the operation unit 4.

Figure 4:
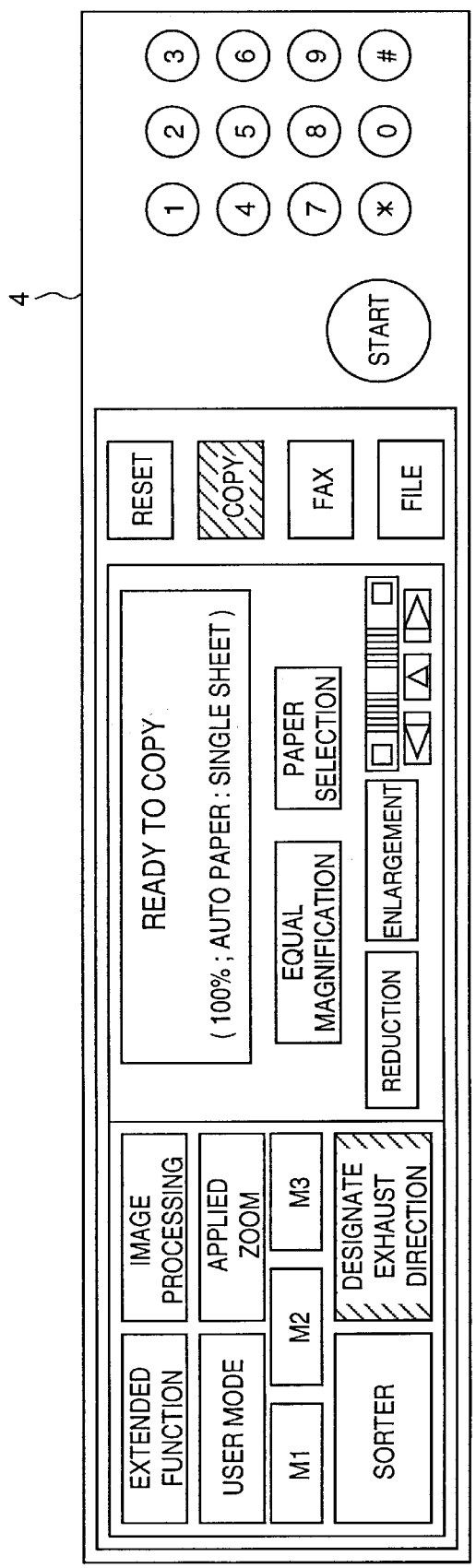
FIG. 4 is a view for explaining an operation screen used upon designation of an exhaust direction designation key.
Figure 5:
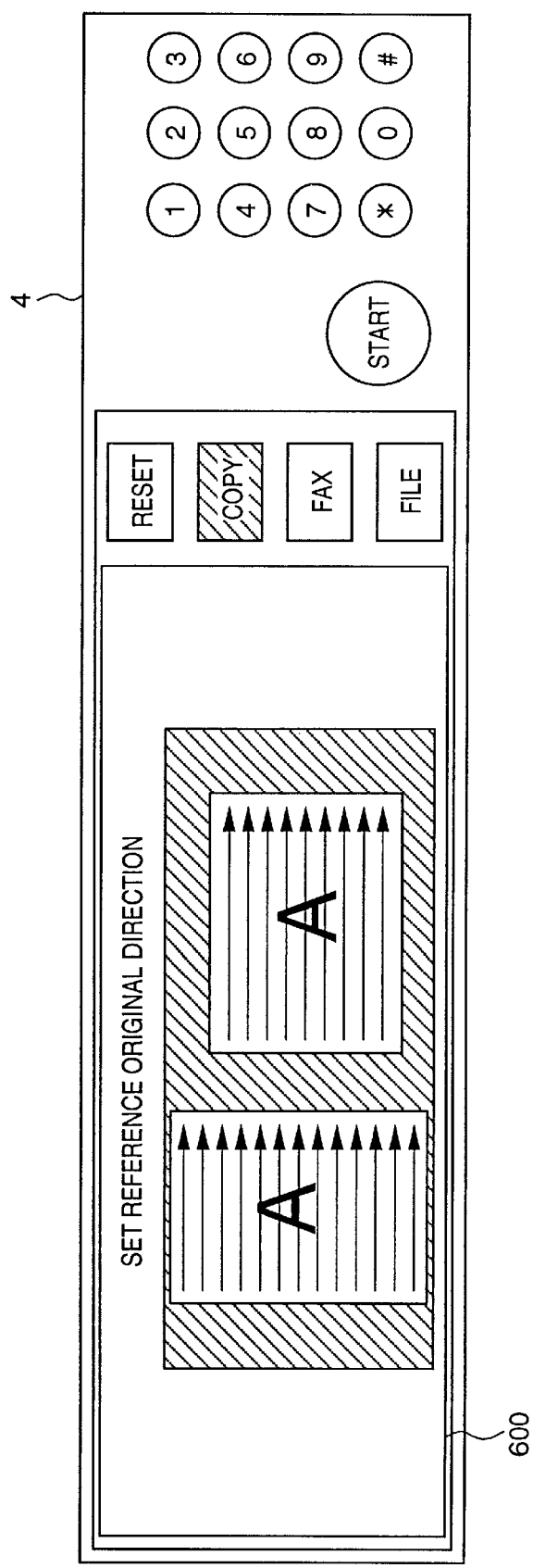
FIG. 5 is a view for explaining the operation screen after the exhaust direction designation key is designated.

When an exhaust direction designation key on the operation unit 4 in FIG. 4 is pressed, the operation unit screen shown in FIG. 5 is displayed. On this screen, the user selects a reference type (portrait or landscape). An original of the type designated on the screen in FIG. 5 is subjected to image rotation processing so as to have a predetermined direction.

Note that the horizontally and vertically written portrait types are processed to be adjusted in one direction. The same applies to the two landscape types.

The operation screen upon selection of, e.g., a portrait type original as the reference type in FIG. 5 will be explained below with reference to FIG. 6.

Figure 6:
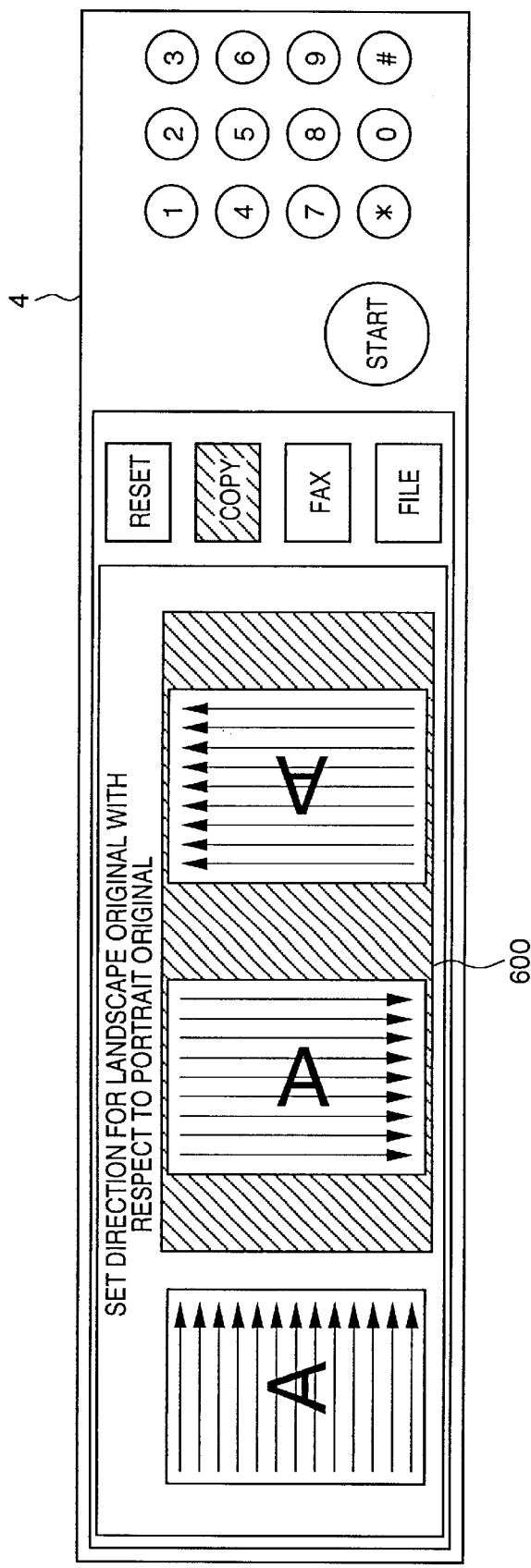
FIG. 6 is a view for explaining the operation screen upon setting an exhaust direction for landscape type originals.

When a portrait type original is selected as the reference type, the output direction for landscape type originals with respect to portrait type originals is selected on the screen in FIG. 6.

When a landscape type original is selected on the screen in FIG. 5, another screen for selecting the output direction for portrait type originals with respect to landscape type originals is displayed. The landscape type original is subjected to image rotation processing in accordance with the designation on the screen shown in FIG. 6.

On the operation screen shown in FIGS. 5 and 6, the user selects an original in a desired direction by touching its icon on a display unit 600.

In this arrangement, when a plurality of originals are read, the document directions of the individual originals are determined, and if the exhaust direction is designated on the screen shown in FIGS. 5 and 6, it is checked if the determined original direction is different from the designated direction. If the determined original direction is different from the designated direction, the read image data is rotated in the designated direction or reference direction, and a sheet formed with the rotated image is then exhausted.

The processing sequence will be explained below with reference to the flow chart in FIG. 7.

Figure 7:
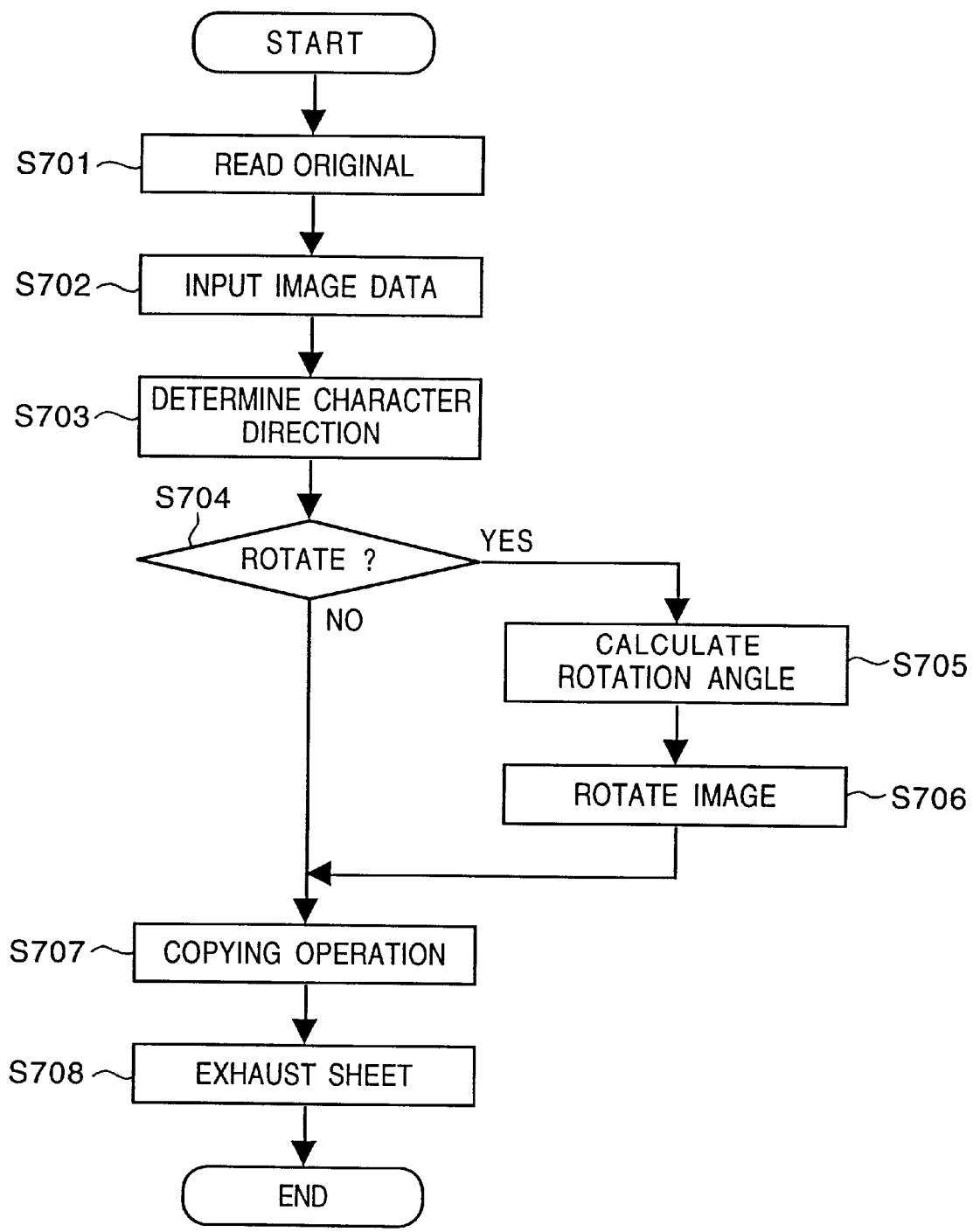
FIG. 7 is a flow chart showing the processing performed when the exhaust direction of an original type that serves as a reference is designated when different types of originals are set at the same time.

Note that a processing program corresponding to the flow chart in FIG. 7 is stored in a memory of the CPU/memory unit 2, and a CPU reads out, interprets, and executes the processing program stored in the memory.

FIG. 7 is a flow chart of the processing for an input original when a plurality of originals having different original directions are input, and the exhaust direction is designated for a reference document content pattern.

In step S701, the scanner unit 1 reads an original image.

In step S702, image data input in step S701 is stored in the storage device 5.

In step S703, the original direction and the portrait or landscape type are determined on the basis of the image data stored in the storage device 5.

In step S704, it is checked based on the determination results in step S703 if the image data of that original is to be rotated, i.e., if the determined direction agrees with the predetermined direction. If YES in step S704, the flow advances to step S705; otherwise, the flow advances to step S707.

In step S705, the rotation angle of the image data is calculated based on the determination results, reference direction, and designated direction.

An example of these processes will be explained below wherein the portrait type is selected on the screen in FIG. 5, and the right landscape type on the screen is selected on the screen in FIG. 6. If it is determined that the original of interest is a portrait type original, the angle in degrees of the direction of that original with respect to the predetermined direction is calculated. On the other hand, if it is determined that the original of interest is a landscape type original, the angle in degrees of the direction of that original with respect to the direction selected on the screen of FIG. 6 is calculated. The direction selected on the screen of FIG. 6 is (predetermined direction) +90° when the left landscape type is selected on the screen in FIG. 6, or is (predetermined direction) −90° when the right landscape type is selected.

In step S706, the image data is rotated through the calculated rotation angle.

In step S707, the image data processed in the above steps is copied. At this time, a sheet on which the rotated image can be normally formed is fed from the corresponding cassette, and the image is copied onto that sheet.

In step S708, the copied sheet is exhausted.

[Second Embodiment]

The hardware arrangement of an image processing apparatus according to the second embodiment of the present invention is the same as that in the first embodiment. In the second embodiment, the processing upon stapling copies by processing a plurality of originals having different document directions will be described below with reference to display examples on the display unit shown in FIGS. 8 and 9.

Figure 8:
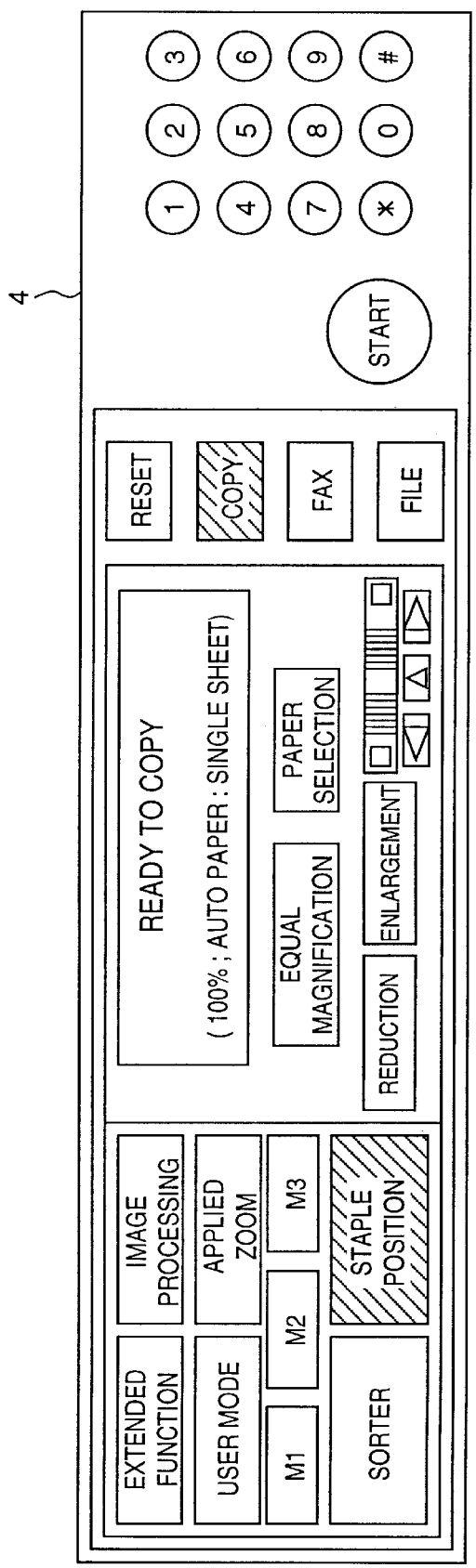
FIG. 8 is a view for explaining the operation screen upon designation of a stapling function.
Figure 9:
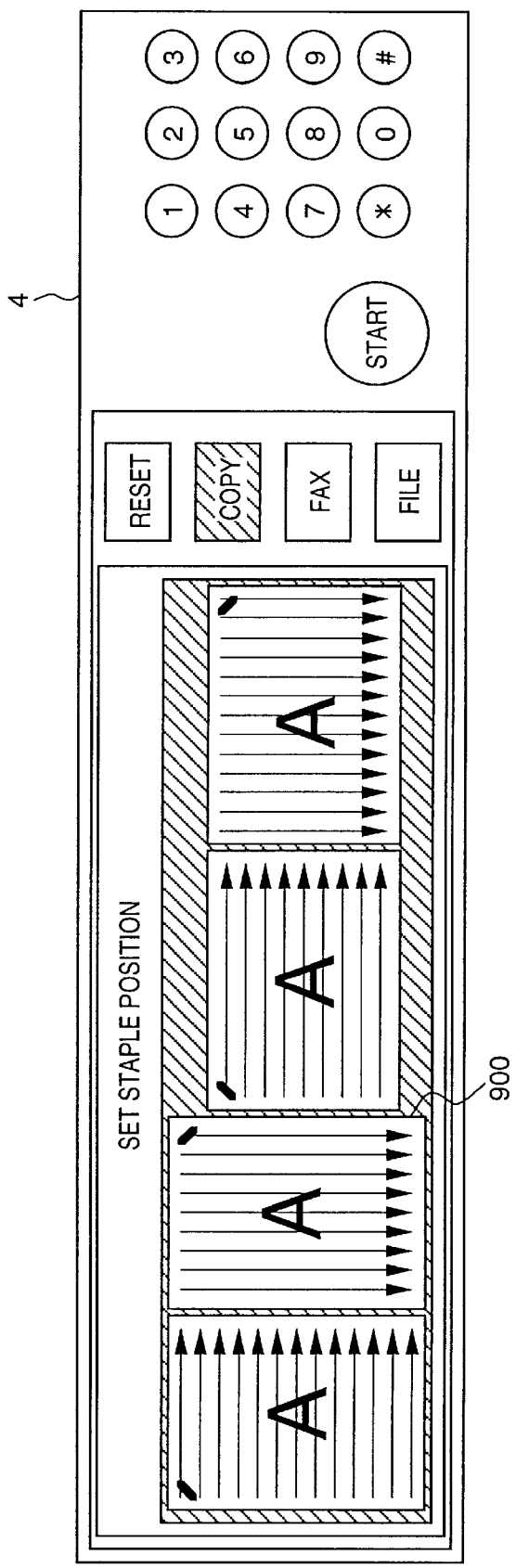
FIG. 9 is a view for explaining the operation screen upon designation of a staple position.

Referring to the display unit shown in FIG. 8, when the user selects a stapling mode here, a staple position setting screen shown in FIG. 9 is displayed.

On the staple position setting screen shown in FIG. 9, the user selects one of four original types, which has a staple position of his or her choice.

For example, assume that the user selects a staple position for a vertically written portrait original (900).

Figure 10:
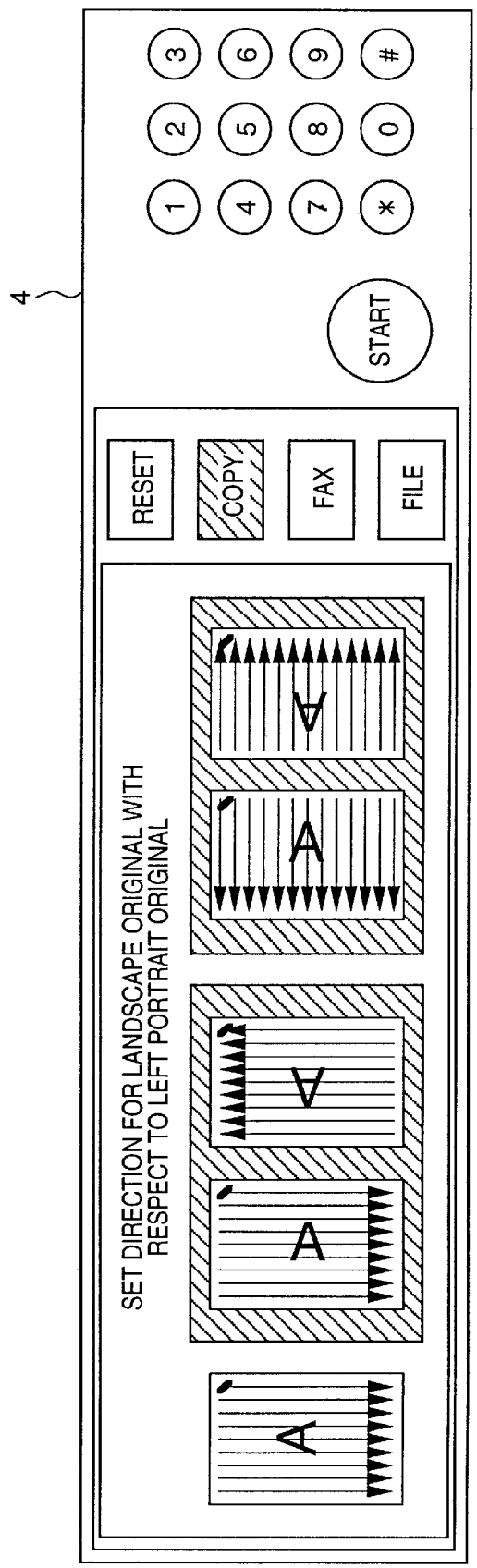
FIG. 10 is a view for explaining the operation screen after the staple position is designated.

In response to this selection, a screen (FIG. 10) for selecting the direction of landscape type original output sheets to be bound together with portrait type original output sheets is displayed as a staple position for landscape type originals.

When the staple position is set in this manner, the directions of images upon exhausting the individual original types are determined, and the rotation angle of each image data can be calculated as in the first embodiment. The image is rotated through the calculated rotation angle, and is copied as in the first embodiment.

After all the copies are formed, the staple sorter 9 staples the copies.

In the second embodiment, the directions of originals having different document directions are set by setting the staple position. Alternatively, binding margin setting may replace the staple position setting.

[Third Embodiment]

The hardware arrangement of an image processing apparatus according to the third embodiment of the present invention is the same as that in the first embodiment.

The processing in the third embodiment will be described below with reference to the flow chart in FIG. 11.

Figure 11:
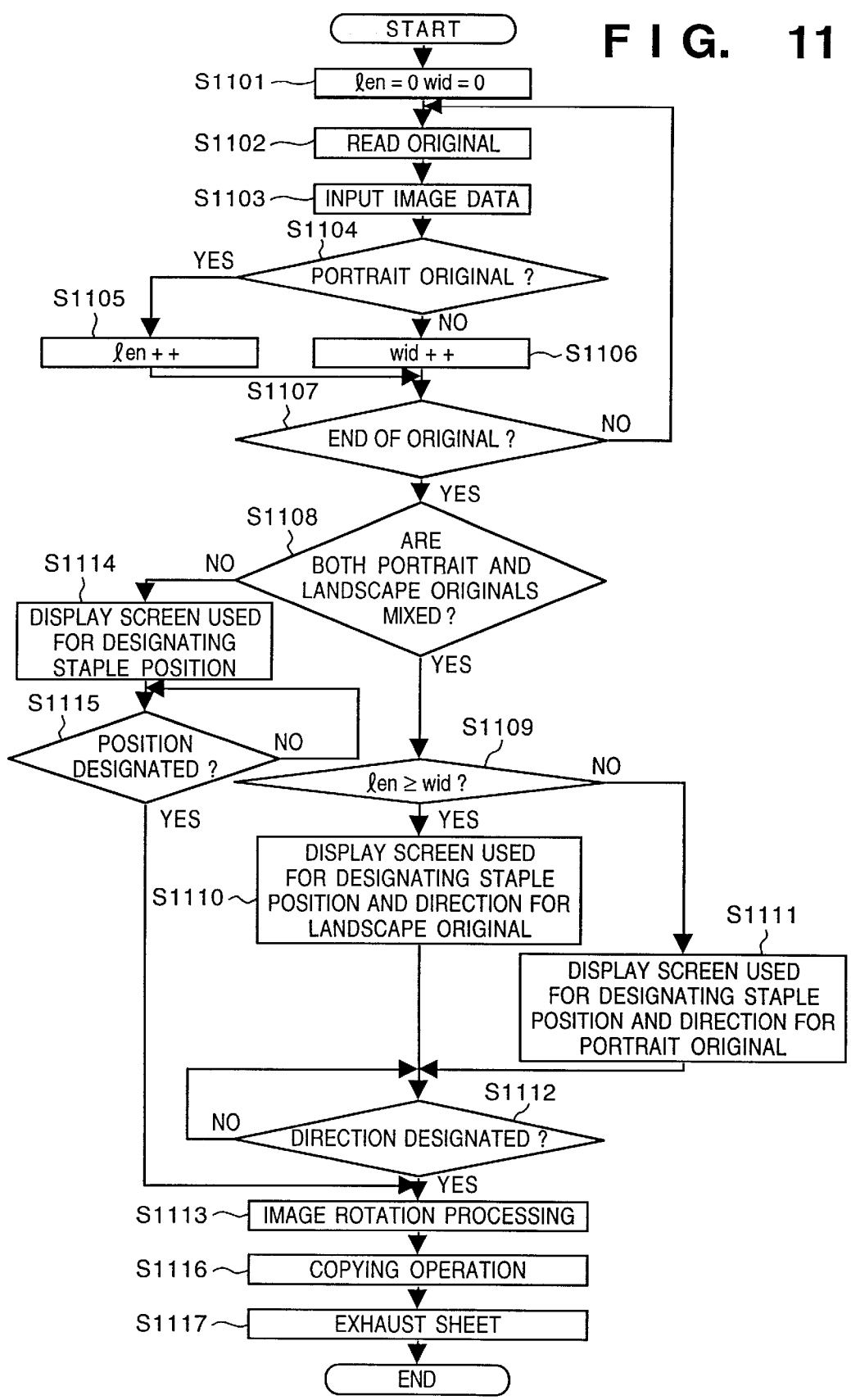
FIG. 11 is a flow chart showing the processing in the image forming apparatus.

FIG. 11 is a flow chart upon determining whether or not originals have different original directions and types, by pre-scanning a plurality of originals when a staple sort mode is designated.

In step S1101, counters for respectively counting the numbers of portrait and landscape type originals, i.e., a portrait original counter len and a landscape original counter wid, are cleared.

In step S1102, one original is read.

In step S1103, image data is input.

In step S1104, the original type and direction are determined based on the input image data. If it is determined based on the determination results that the original is a portrait type original, the flow advances to step S1105; otherwise, the flow advances to step S1106.

In step S1105, the portrait original counter len is incremented by 1, and the flow advances to step S1107.

In step S1106, the landscape original counter wid is incremented by 1.

It is checked in step S1107 if an original or originals to be read still remain. If an original or originals to be read remain, the flow returns to step S1102 to repeat the same processing. Otherwise, the flow advances to step S1108.

In step S1108, it is checked by looking up the portrait and landscape counter values, i.e., the portrait original counter len and the landscape original counter wid, if originals of different types are mixed. If YES in step S1108, the flow advances to step S1109; otherwise, the flow advances to step S1114.

In step S1109, the contents of the portrait original counter len and the landscape original counter wid are compared with each other. If the contents of the landscape original counter wid are smaller than those of the portrait original counter len, the flow advances to step S1111; otherwise, the flow advances to step S1110. That is, one of the portrait and landscape type originals is determined to be a reference original.

In step S1110, since the number of portrait type originals is larger than that of landscape type originals, the screen (FIG. 10) for setting the staple position for portrait type originals and setting the direction of landscape type originals with respect to portrait type originals is displayed.

On the other hand, in step S1111, since the number of landscape type originals is larger than that of portrait type originals, a screen for setting the staple position for landscape type originals and setting the direction of portrait type originals with respect to landscape type originals is displayed.

In step S1112, the control waits until the user designates the staple position and the original direction on the basis of the screen displayed in step S1110 or S1111 above. If the position and direction are designated, the flow advances to step S1113.

In step S1113, the image direction upon exhausting a sheet is determined on the basis of the staple position designated in step S1112. The rotation angle of image data is then calculated as in the first embodiment.

Rotation processing of the image data is done based on the calculated rotation angle.

In step S1116, the image rotated in step S1113 is copied as in the first embodiment.

In step S1117, the copied sheet is exhausted.

On the other hand, if it is determined in step S1118 that originals of different types are not mixed, and the flow advances to step S1114, the screen used by the user to designate the staple position is displayed.

In step S1115, the control waits until the user designates the staple position. If the staple position is input, the flow advances to step S1113 to execute the above-mentioned processing.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Figure 12:
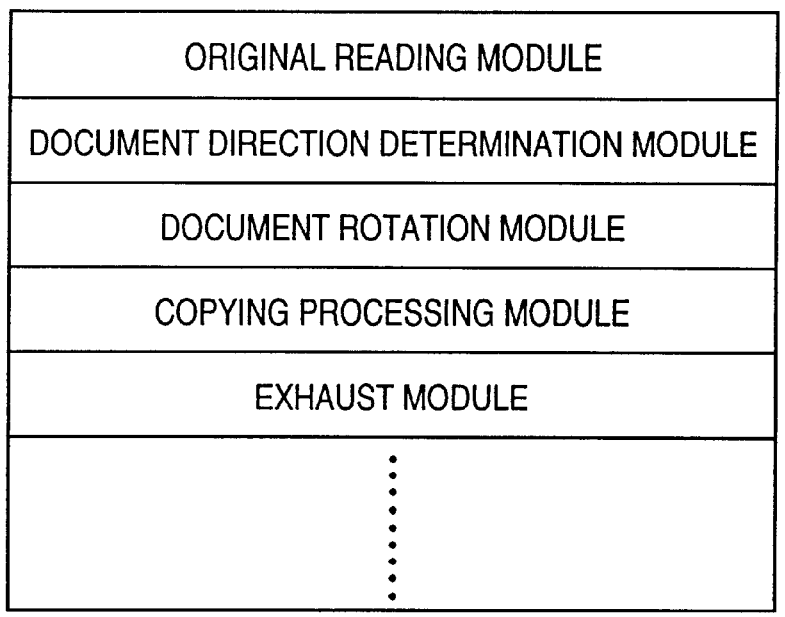
FIG. 12 is a view showing an example of processing program codes corresponding to the flow chart in FIG. 7 and stored in a computer readable storage medium.
Figure 13:
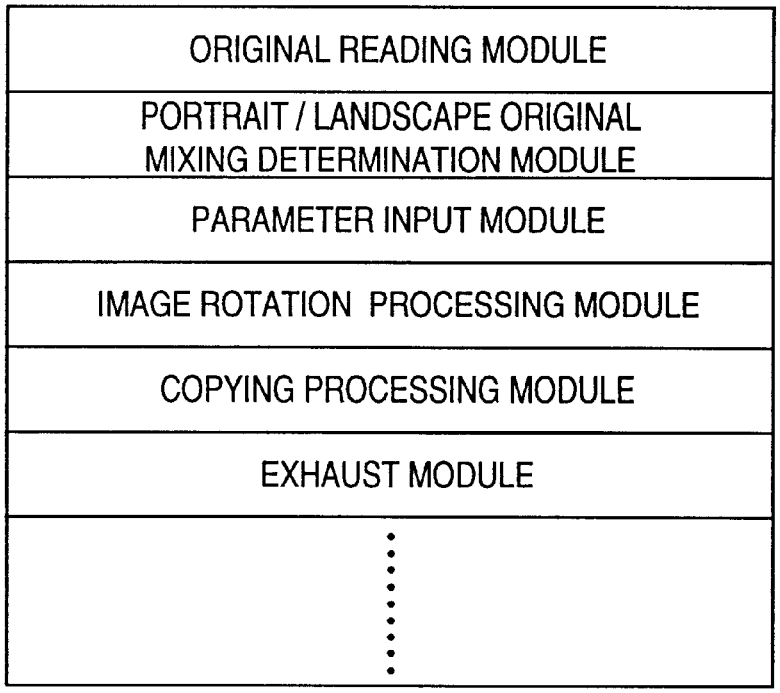
FIG. 13 is a view showing an example of processing program codes corresponding to the flow chart in FIG. 11 and stored in a computer readable storage medium.

When the present invention is applied to the storage medium, the storage medium stores program codes corresponding to the above-mentioned flow charts. Such storage medium will be briefly explained below. In this case, modules shown in a memory map example in FIG. 12 or 13 are stored in the storage medium.

That is, the storage medium can store, as processing program codes corresponding to the flow chart shown in FIG. 7, program codes of at least an "original reading module" for inputting an original via the scanner unit 1, a "document direction determination module" for determining the document direction of the input original, a "document rotation module" for rotating a document on the basis of the determined document direction, a "copying processing module" for copying the rotated document, and an "exhaust module" for exhausting the copied sheet.

On the other hand, the storage medium can store, as processing program codes corresponding to the flow chart shown in FIG. 11, program codes of at least an "original reading module" for inputting an original via the scanner unit 1, a "portrait/landscape original mixing determination module" for determining if input originals include both portrait and landscape originals, a "parameter input module" for inputting parameters, i.e., a staple position and an original direction, a "document rotation module" for rotating a document on the basis of the determined document direction, a "copying processing module" for copying the rotated document, and an "exhaust module" for exhausting the copied sheet.

As described above, upon placing originals on the platen, even when those originals include both portrait and landscape types, the user can set a staple position or binding margin at a desired position regardless of the directions in which such originals are placed.

[Fourth Embodiment]

The hardware arrangement of an image processing apparatus of the fourth embodiment is the same as that in the first embodiment. In this embodiment, the operation unit 4 can display a screen (touch panel) for setting a reduced-scale layout mode. In the reduced-scale layout mode, images of a plurality of originals are copied onto a single sheet in a reduced scale.

FIGS. 14A and 14D are views for explaining the first layout mode processing in an image forming apparatus of the present invention, and this processing corresponds to layout processing in, e.g., a 4-in-1 mode for copying four original images onto a single sheet. Note that the original direction can be classified into four directions, i.e., a horizontally written portrait direction, vertically written portrait direction, vertically written landscape direction, and horizontally written landscape direction depending on the character direction and character string direction when a paper sheet is viewed from an identical direction.

FIG. 14A shows a layout method LAY1 when the original direction agrees with the horizontally written portrait direction. In this case, since the character string direction agrees with the horizontal writing direction, original images P1 to P4 are laid out on regions L1 to L4 in the order of upper left, upper right, lower left, and lower right positions so as to read texts from the left side. FIG. 14B shows a layout method LAY2 when the original direction agrees with the vertically written portrait direction. In this case, since the character string direction agrees with the vertical writing direction, original images P11 to P14 are laid out on regions L11 to L14 in the order from the upper right position so as to read texts from the right side.

FIG. 14C shows a layout method LAY3 when the original direction agrees with the vertically written landscape direction. In this case, since the character direction agrees with the vertical writing direction but the original direction agrees with the landscape direction, original images P21 to P24 are laid out on regions L21 to L24 in the order from the upper left position to allow easy reading. FIG. 14D shows a layout method LAY4 when the original direction agrees with the horizontally written landscape direction. In this case, since the original direction agrees with the landscape direction and the character string direction agrees with the horizontal writing direction, original images P31 to P34 are laid out on regions L31 to L34 in the order from the lower left position to allow easy reading.

FIG. 15 shows an example of layouts determined in correspondence with the directions of originals fed from the RDF 180 shown in FIG. 1.

In FIG. 15, (a) to (h) represent originals, which are fed onto the platen glass 101 by the RDF 180 in the order from original (1).

As shown in FIG. 15, originals (a) to (h) include two horizontally written portrait originals (originals (a) and (f)), one vertically written portrait original (original (h)), one vertically written landscape original (original (d)), and four horizontally written landscape originals (originals (b), (c), (e), and (g)), and the number of horizontally written landscape originals is the largest among these originals. In this embodiment, it is determined that the layout method shown in FIG. 14D is most suitable, thus obtaining layout outputs (A) and (B) in FIG. 15.

In this case, when the first embodiment is applied, layouts (C) and (D) can be obtained.

Figure 16:
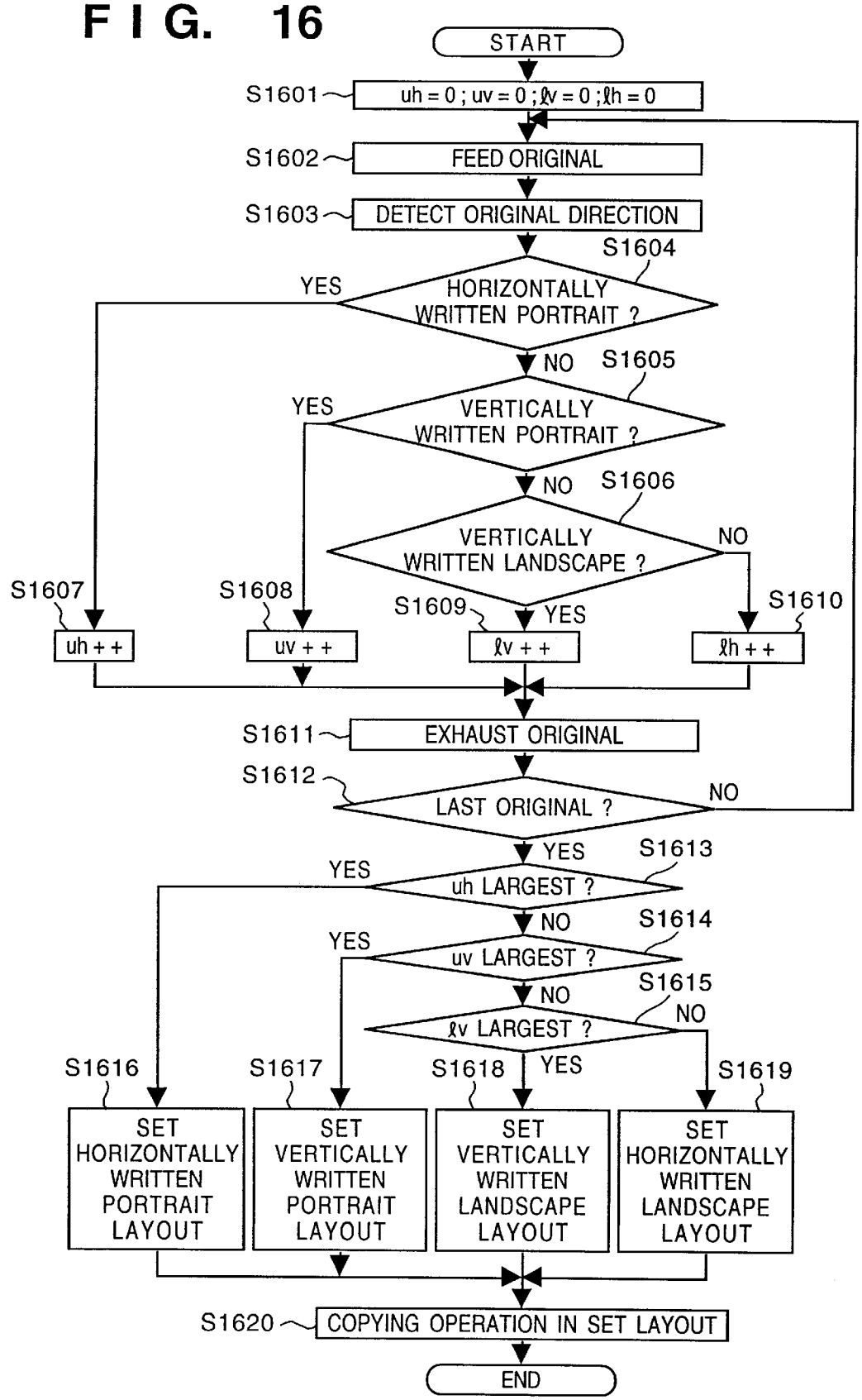
FIG. 16 is a flow chart showing an example of the first layout mode processing sequence.

FIG. 16 is a flow chart showing an example of the first layout mode processing sequence in the image forming apparatus according to the present invention. Note that S1601 to S1620 indicate steps, which correspond to the processing for determining layout in correspondence with the majority original direction.

In step S1601, count variables for counting the four different types of originals are initialized, and the flow advances to step S1602. Note that uh, uv, lv, and lh are respectively horizontally written portrait, vertically written portrait, vertically written landscape, and horizontally written landscape count variables.

In step S1602, one original is fed, and the flow advances to step S1603. In step S1603, the character direction and character string direction of the original are detected to determine the original type, and the flow advances to step S1604 to check if the original direction of the fed original agrees with the horizontally written portrait direction. If YES in step S1604, the flow advances to step S1607 to increment the counter variable uh, and the flow then advances to step S1611 and the subsequent steps.

On the other hand, if NO in step S1604, the flow advances to step S1605 to check if the original direction of the original agrees with the vertically written portrait direction. If YES in step S1605, the flow advances to step S1608 to increment the count variable uv, and the flow then advances to step S1611 and the subsequent steps.

On the other hand, if NO in step S1605, the flow advances to step S1606 to check if the original direction of the original agrees with the vertically written landscape direction. If YES in step S1606, the flow advances to step S1609 to increment the count variable lv, and the flow then advances to step S1611 and the subsequent steps.

On the other hand, if NO in step S1606, the flow advances to step S1610 to increment the count variable 1h, and the flow then advances to step S1611 and the subsequent steps.

In step S1611, the original is exhausted from the platen glass 101, and the flow advances to step S1612 to check if the currently processed original is the final page. If YES in step S1612, the flow advances to step S1613; otherwise, the flow returns to step S1602 to repeat steps S1602 to S1611 until the final page is reached.

In step S1613, the count variables are compared to check if the count variable uh (horizontally written portrait) is largest. If YES in step S1613, the flow advances to step S1616 and the layout method is determined to be the one for horizontally written portrait originals. Thereafter, the flow advances to step S1620.

On the other hand, if NO in step S1613, the flow advances to step S1614, and the count variables are compared to check if the count variable uv (vertically written portrait) is largest. If YES in step S1614, the flow advances to step S1617, and the layout method is determined to be the one for vertically written portrait originals. Thereafter, the flow advances to step S1620.

On the other hand, if NO in step S1614, the flow advances to step S1615, and the count variables are compared to check if the count variable lv (vertically written landscape) is largest. If YES in step S1615, the flow advances to step S1618, and the layout method is determined to be the one for vertically written landscape originals. Thereafter, the flow advances to step S1620.

On the other hand, if NO in step S1615, the flow advances to step S1619, and the layout method is determined to be the one for horizontally written landscape originals. Thereafter, the flow advances to step S1620. In step S1620, copying is done by the set layout method.

In this manner, original images are laid out in a reduced scape in correspondence with the largest number of original directions among a stack of originals on the RDF 180 so as to obtain layout outputs.

[Fifth Embodiment]

In the above embodiment, original images are laid out in a reduced scape in correspondence with the largest number of original directions among a stack of originals on the RDF 180 so as to obtain layout outputs. Alternatively, the reduced-scale layout may be automatically determined in correspondence with the direction of an original which is fed first among a stack of originals on the RDF 180. Such embodiment will be described below.

FIG. 17 shows a second layout output example in an image forming apparatus according to the fifth embodiment, and the layout is determined in correspondence with the direction of an original which is fed first by the RDF 180.

In FIG. 17, (a) to (h) represent originals, which are fed onto the platen glass 101 by the RDF 180 in the order from original (a).

As shown in FIG. 17, originals (a) to (h) include two horizontally written portrait originals (originals (a) and (f), one vertically written portrait original (original (h)), one vertically written landscape original (original (d)), and four horizontally written landscape originals (originals (b), (c), (e), and (g)). When the first original is a horizontally written landscape original, it is determined in this embodiment that the layout method shown in FIG. 14A is most suitable to obtain layout outputs (A) and (B) in FIG. 17.

Figure 18:
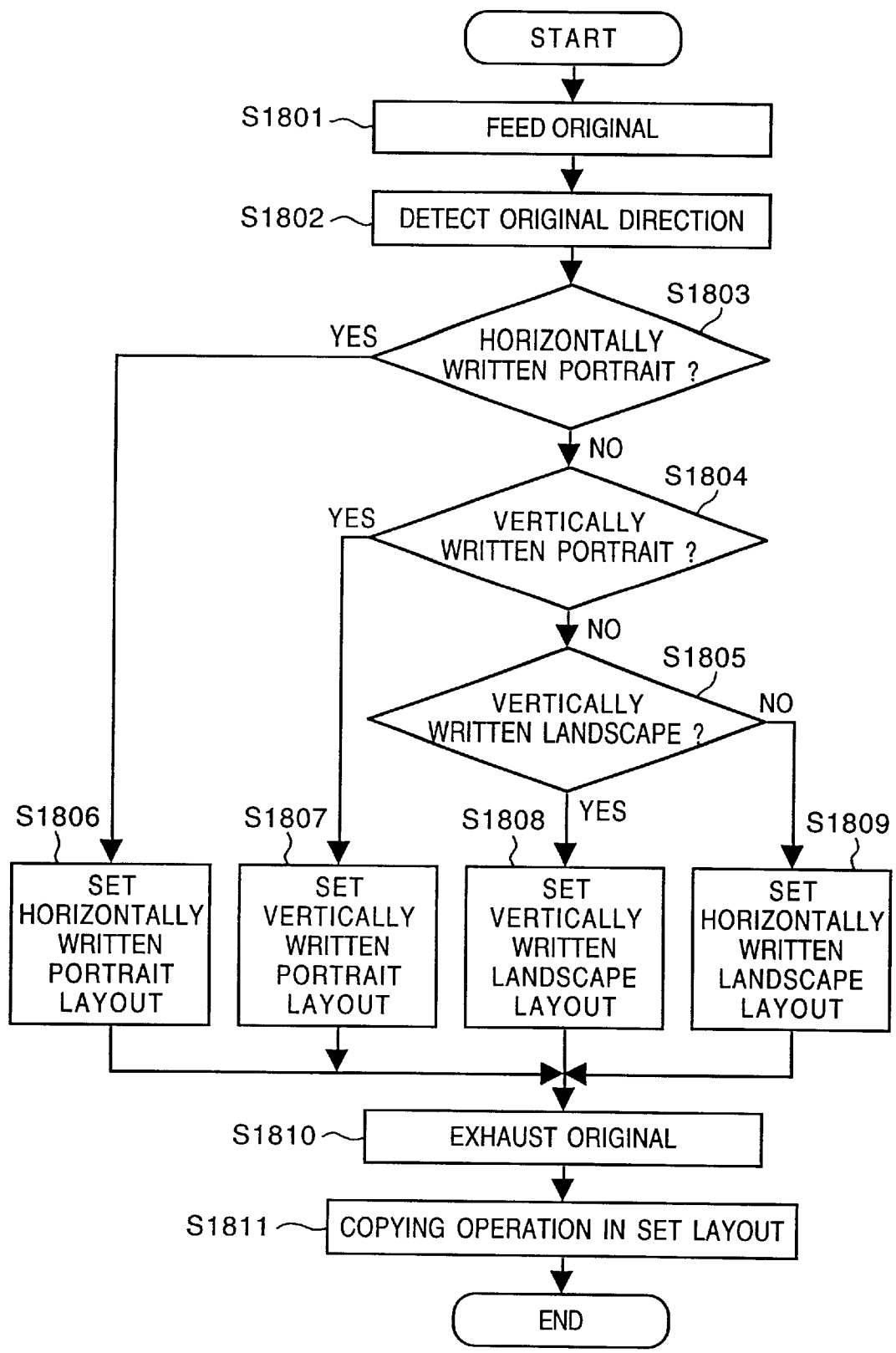
FIG. 18 is a flow chart showing an example of the second layout mode processing sequence.

FIG. 18 is a flow chart showing an example of the second layout mode processing sequence in the image forming apparatus according to the present invention. Note that S1801 to S1811 indicate steps, which correspond to the processing for determining layout in correspondence with the original direction of the first original.

In step S1801, one original is fed, and the flow advances to step S1802. In step S1802, the character direction and character string direction of the original are detected to determine the original type, and the flow advances to step S1803 to check if the original direction of the fed original agrees with the horizontally written portrait direction. If YES in step S1803, the flow advances to step S1806 to set the layout method for horizontally written portrait originals. Thereafter, the flow advances to step S1810 and the subsequent steps.

On the other hand, if NO in step S1803, the flow advances to step S1804 to check if the original direction of the fed original agrees with the vertically written portrait direction. If YES in step S1804, the flow advances to step S1807 to set the layout method for vertically written portrait originals. Thereafter, the flow advances to step S1810 and the subsequent steps.

On the other hand, if NO in step S1804, the flow advances to step S1805 to check if the original direction of the fed original agrees with the vertically written landscape direction. If YES in step S1805, the flow advances to step S1808 to set the layout method for vertically written landscape originals. Thereafter, the flow advances to step S1810 and the subsequent steps.

On the other hand, if NO in step S1805, the flow advances to step S1809 to set the layout method for horizontally written landscape originals. Thereafter, the flow advances to step S1810.

In step S1810, the fed original is exhausted from the platen glass 101, and the flow advances to step S1811. In step S1811, copying is done by the set method, thus ending the processing.

In this manner, the layout method is determined on the basis of the character direction, character string direction, and type of original which is fed first, thus obtaining a layout output which is easy to see.

The architecture of a data processing program that can be read out by the CPU of the image forming apparatus according to the present invention will be described below with reference to the memory map shown in FIG. 19.

Figure 19:
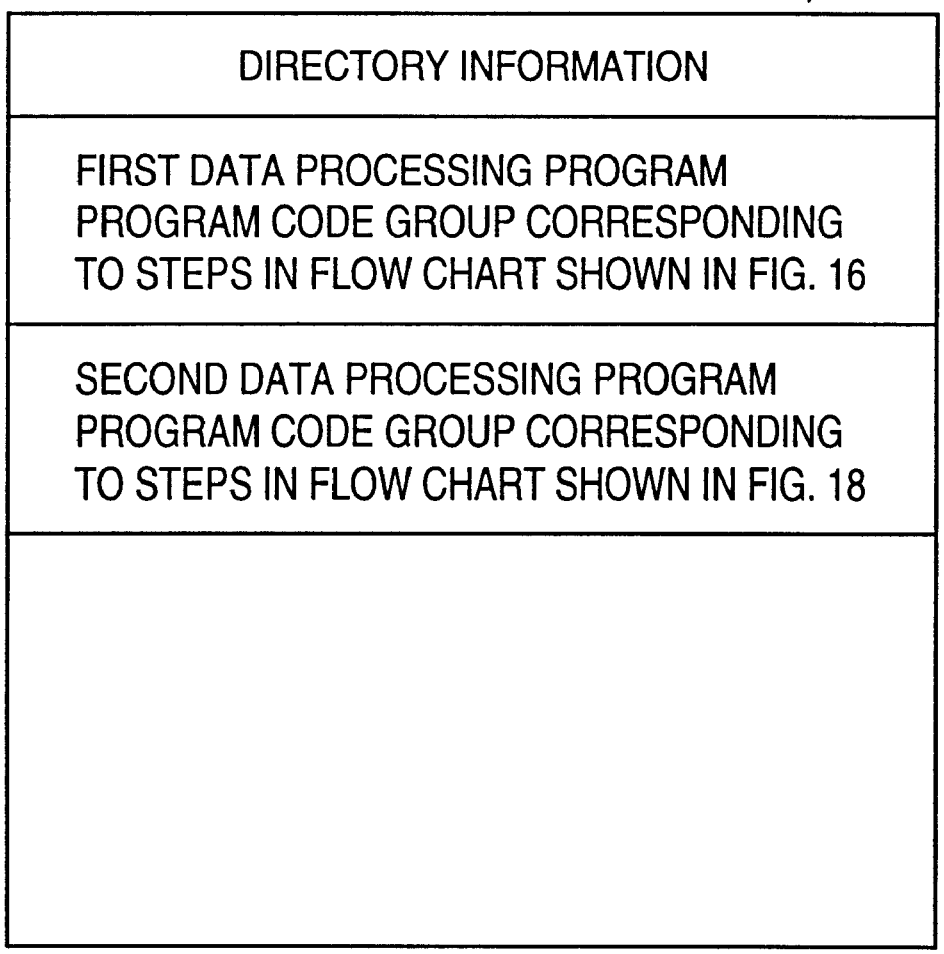
FIG. 19 is a view for explaining a memory map of a storage medium that stores various data processing programs that can be read out by the image forming apparatus according to the present invention.

FIG. 19 is a view for explaining the memory map of a storage medium that stores various data processing programs which can be read out by the image forming apparatus according to the present invention.

Although not shown, information for managing programs stored in the storage medium, e.g., version information, a creator, and the like may be stored, and information depending on the OS on the program reading side, e.g., icons that identify programs, and the like may be stored.

Furthermore, data subdominant to various programs are also managed by the directory. Furthermore, a program for installing various programs into a computer, a program for decompressing programs to be installed when these programs are compressed, and the like may also be stored.

The functions shown in FIGS. 16 and 18 in the above embodiment may be implemented by a host computer in accordance with externally installed programs. In this case, the present invention can be applied even to a case wherein an information group including programs are supplied from a storage medium such as a CD-ROM, flash memory, FD, or the like, or an external storage medium via a network to an output apparatus.

As described above, the storage medium that records program codes of software for implementing the functions of the above embodiments is supplied to a system or apparatus, and a computer (or a CPU or MPU) of the system or apparatus reads out and executes the program codes stored in the storage medium, thus also achieving the object of the present invention.

In this case, the program codes themselves read out from the storage medium implement novel functions of the present invention, and the storage medium that stores the program codes constitutes the present invention.

As the storage medium for supplying the program codes, for example, a floppy disk, hard disk, optical disk, magneto-optical disk, CD-ROM, CD-R, magnetic tape, nonvolatile memory card, ROM, EEPROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   preset means for presetting either of a first direction to which a portrait type image should be adjusted or a second direction, other than the first direction, to which a landscape type image should be adjusted;
   input means for inputting, one by one, a plurality of original sheets including an original sheet having an image on the sheet that is of a portrait type and an original sheet having an image on the sheet that is of a landscape type;
   determination means for determining if an image on each original sheet input by said input means is of the portrait type or the landscape type;
   rotation means for rotating the input image in correspondence with the determination results of said determination means so that a portrait type input image is adjusted to the first direction preset by said preset means and a landscape type input image is adjusted to the second direction preset by said preset means;
   setting means for setting a relative relationship between the first direction and the second direction; and
   selecting means for selecting a portrait type or a landscape type as a reference type, wherein the first direction and the second direction are determined based on the reference type selected by said selecting means and the relative relationship set by said setting means.

2. The apparatus according to claim 1, wherein the first direction is perpendicular to the second direction.

3. The apparatus according to claim 1, further comprising:

image forming means for forming the image rotated by said rotation means onto a sheet.

4. The apparatus according to claim 3, further comprising:

binding processing means for binding the sheet on which the image is formed by said image forming means.

5. The apparatus according to claim 1, wherein said determination means determines a direction of characters in the input image.

6. The apparatus according to claim 3, wherein said image forming means forms an image while leaving a binding margin.

7. The apparatus according to claim 6, wherein said determination means determines the direction of characters in the input image by using a character recognition function.

8. An image processing method comprising:

a preset step of presetting either of a first direction to which a portrait type image should be adjusted or a second direction, other than the first direction, to which a landscape type image should be adjusted;

an input step of inputting, one by one, a plurality of original sheets including an original sheet having an image on the sheet that is of a portrait type and an original sheet having an image on the sheet that is of a landscape type;

a determination step of determining if an image on each original sheet input in said input step is of the portrait type or the landscape type;

a rotation step of rotating the input image in correspondence with the determination results of said determination step so that a portrait type input image is adjusted to the first direction preset at said preset step and a landscape type input image is adjusted to the second direction preset at said preset step;

a setting step of setting a relative relationship between the first direction and the second direction; and a selecting step of selecting a portrait type or a landscape type as a reference type, wherein the first direction and the second direction are determined based on the reference type selected in said selecting step and the relative relationship set in said setting step.

9. The method according to claim 8, wherein the first direction is perpendicular to the second direction.

10. The method according to claim 8, further comprising:

an image forming step of forming the image rotated in said rotation step onto a sheet.

11. The method according to claim 10, further comprising:

a binding processing step of binding the sheet on which the image is formed in said image forming step.

12. The method according to claim 10, wherein said image forming step forms an image while leaving a binding margin.

13. The method according to claim 8, wherein said determination step determines a direction of characters in the input image.

14. The method according to claim 13, wherein said determination step determines a direction of characters in the input image by using a character recognition function.

15. A medium storing a program for causing a computer to execute an image processing method, wherein said computer is caused to perform:

a preset function of presetting either of a first direction to which a portrait type image should be adjusted or a second direction, other than the first direction, to which a landscape type image should be adjusted;

an input function of inputting, one by one, a plurality of original sheets including an original sheet having an image on the sheet that is of a portrait type and an original sheet having an image on the sheet that is of a landscape type;

a determination function of determining if an image on each original sheet input by said input function is of the portrait type or the landscape type;

a rotation function of rotating the input image in correspondence with the determination results of said determination function so that a portrait type input image is adjusted to the first direction preset by said preset function and a landscape type input image is adjusted to the second direction preset by said preset function;

a setting function of setting a relative relationship between the first direction and the second direction; and a selection function of selecting a portrait type or a landscape type as a reference type, wherein the first direction and the second direction are determined based on the reference type selected by said selecting function and the relative relationship set by said setting function.

* * * * *

UNITED STATES PATENT AND TRADEMARK OFFICE
CERTIFICATE OF CORRECTION

PATENT NO. : 6,304,681 B1
DATED : October 16, 2001
INVENTOR(S) : Akiba et al.

It is certified that error appears in the above-identified patent and that said Letters Patent is hereby corrected as shown below:

<u>Column 13,</u>
Line 19, "claim 6," should read -- claim 5, --.

Signed and Sealed this

Fourteenth Day of May, 2002

*Attest:*

JAMES E. ROGAN
*Attesting Officer*   *Director of the United States Patent and Trademark Office*